US008687710B2

(12) United States Patent
Chin

(10) Patent No.: US 8,687,710 B2
(45) Date of Patent: Apr. 1, 2014

(54) INPUT FILTERING IN A VIDEO ENCODER

(75) Inventor: Douglas Chin, Haverhill, MA (US)

(73) Assignee: Broadcom Corporation, Irvine, CA (US)

(*) Notice: Subject to any disclaimer, the term of this patent is extended or adjusted under 35 U.S.C. 154(b) by 2176 days.

(21) Appl. No.: 11/434,979

(22) Filed: May 16, 2006

(65) Prior Publication Data

US 2006/0262844 A1 Nov. 23, 2006

Related U.S. Application Data

(60) Provisional application No. 60/681,932, filed on May 17, 2005.

(51) Int. Cl.
H04N 7/12 (2006.01)

(52) U.S. Cl.
USPC .................. 375/240.29; 375/240.16

(58) Field of Classification Search
USPC ........................ 375/240.29, 240.16
See application file for complete search history.

(56) References Cited

U.S. PATENT DOCUMENTS

| 5,686,962 | A | * | 11/1997 | Chung et al. | 375/240.16 |
|---|---|---|---|---|---|
| 6,556,718 | B1 | * | 4/2003 | Piccinelli et al. | 382/236 |
| 6,963,608 | B1 | * | 11/2005 | Wu | 375/240.03 |
| 2001/0031002 | A1 | * | 10/2001 | Hashimoto et al. | 375/240.03 |
| 2003/0235248 | A1 | * | 12/2003 | Kim et al. | 375/240.12 |
| 2004/0202248 | A1 | * | 10/2004 | Boroczky et al. | 375/240.12 |
| 2005/0053131 | A1 | * | 3/2005 | Domke et al. | 375/240.01 |
| 2006/0007027 | A1 | * | 1/2006 | Ishizuka et al. | 341/50 |
| 2006/0017843 | A1 | * | 1/2006 | Shi et al. | 348/441 |

* cited by examiner

Primary Examiner — Anner Holder
(74) Attorney, Agent, or Firm — Brinks Gilson & Lione

(57) ABSTRACT

Presented herein are systems, methods, and apparatus for real-time high definition television encoding. In one embodiment, there is a method for encoding video data. The method comprises performing motion estimation in parallel of a plurality of pictures using original reference pictures associated with the plurality of pictures; examining the plurality of pictures to determine whether their content is complex; and low pass filtering pictures with complex content to smooth them before proceeding to continue with the encoding process.

19 Claims, 7 Drawing Sheets

INPUT FILTERING IN A VIDEO ENCODER

RELATED APPLICATIONS

This application claims priority to "Input Filtering in a Video Encoder", Provisional Application for U.S. Patent, Ser. No. 60/681,932, filed May 17, 2005, which is incorporated herein by reference.

This application makes reference to:
U.S. Provisional Patent Application Ser. No. 60/681,268 filed May 16, 2005; and
U.S. Provisional Patent Application Ser. No. 60/681,642 filed May 17, 2005.

The above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Advanced Video Coding (AVC) (also referred to as H.264 and MPEG-4, Part 10) can be used to compress high definition television content for transmission and storage, thereby saving bandwidth and memory. However, encoding in accordance with AVC can be computationally intense.

In certain applications, for example, live broadcasts, it is desirable to compress high definition television content in accordance with AVC in real time. However, the computationally intense nature of AVC operations in real time may exhaust the processing capabilities of certain processors. Parallel processing may be used to achieve real time AVC encoding, where the AVC operations are divided and distributed to multiple instances of hardware, which perform the distributed AVC operations, simultaneously.

Ideally, the throughput can be multiplied by the number of instances of the hardware. However, in cases where a first operation is dependent on the results of a second operation, the first operation may not be executable simultaneously with the second operation. In contrast, the performance of the first operation may have to wait for completion of the second operation.

AVC uses temporal coding to compress video data. Temporal coding divides a picture into blocks and encodes the blocks using similar blocks from other pictures, known as reference pictures. To achieve the foregoing, the encoder searches the reference picture for a similar block. This is known as motion estimation. At the decoder, the block is reconstructed from the reference picture. However, the decoder uses a reconstructed reference picture. The reconstructed reference picture is different, albeit imperceptibly, from the original reference picture. Therefore, the encoder uses encoded and reconstructed reference pictures for motion estimation.

Using encoded and reconstructed reference pictures for motion estimation causes encoding of a picture to be dependent on the encoding of the reference pictures. This can be disadvantageous for parallel processing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for encoding video data in real time, substantially as shown in and/or described in connection with at least one of the figures, as set forth more completely in the claims These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
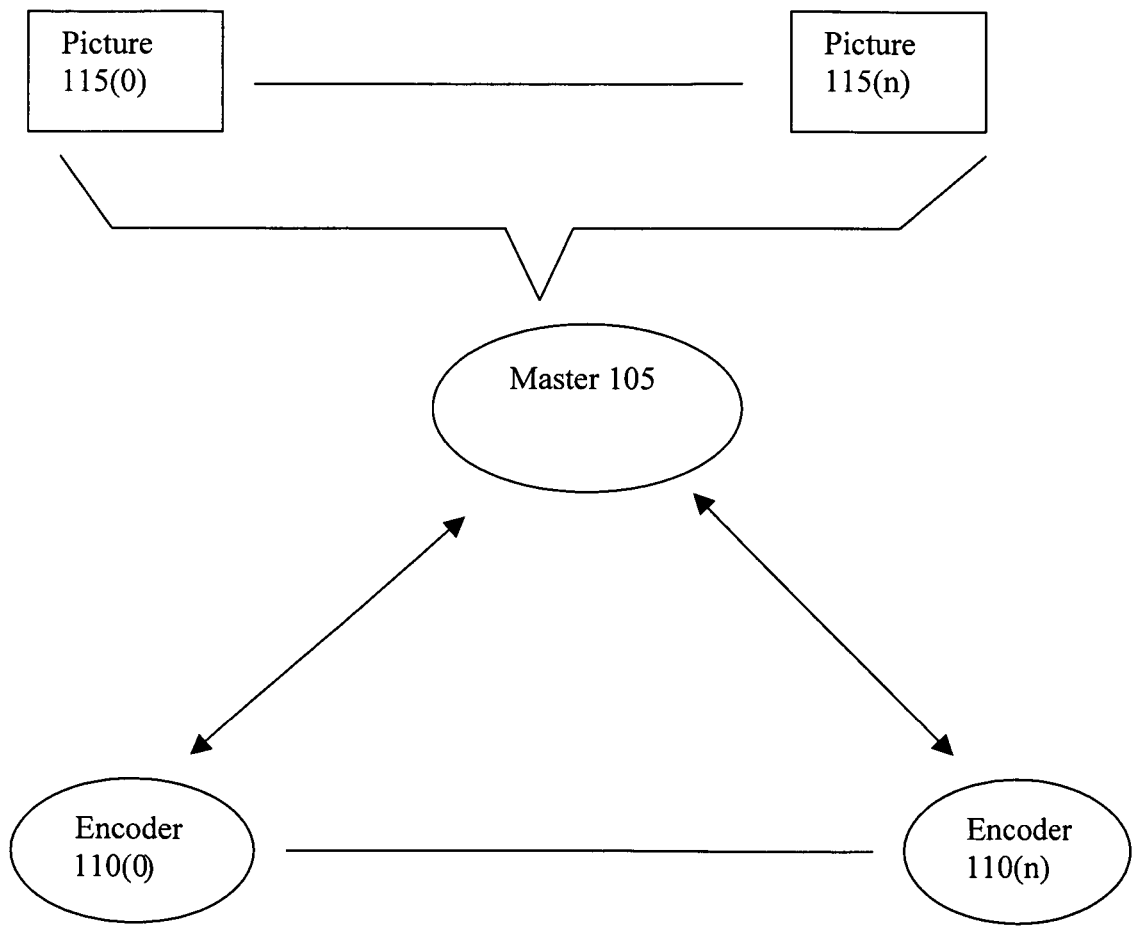
FIG. 1 is a block diagram of an exemplary system for encoding video data in accordance with an embodiment of the present invention.

Referring now to FIG. 1, there is illustrated a block diagram of an exemplary system 100 for encoding video data 102 in accordance with an embodiment of the present invention. The video data comprises a plurality of pictures 115(0) . . . 115(n). The system comprises a plurality of encoders 110(0) . . . 110(n). The plurality of encoders 110(0) . . . 110(n) estimate amounts of data for encoding a corresponding plurality of pictures 115(0) . . . 115(n), in parallel. A master 105 generates a plurality of target rates corresponding to the pictures and the encoders. The encoders 110(0) . . . 110(n) lossy compress the pictures based on the corresponding target rates.

The master 105 can receive the video data 102 for compression. Where the master 105 receives the video data 102 for compression, the master 105 can divide the video data among the encoders 110(0) . . . 110(n), provide the divided portions of the video data 102 to the different encoders, and play a role in controlling the rate of compression.

In certain embodiments, the compressed pictures are returned to the master 105. The master 105 collates the compressed pictures, and either writes the compressed video data to a memory (such as a DVD) or transmits the compressed video data over a communication channel.

The master 105 plays a role in controlling the rate of compression by each of the encoders 110(0) . . . 110(n). Compression standards, such as AVC, MPEG-2, and VC-1 use both lossless and lossy compression to encode video data 102. In lossless compression, information from the video data 102 is not lost from the compression. However, in lossy compression, some information from the video data 102 is lost to improve compression. An example of lossy compression is the quantization of non-integers.

Lossy compression involves trade-off between quality and compression. Generally, the more information that is lost during lossy compression, the better the compression rate, but, the more the likelihood that the information loss perceptually changes the video data 102 and reduces quality.

The encoders 110 perform a pre-encoding estimation of the amount of data for encoding pictures 115. For example, the encoders 110 can estimate the amount of data for encoding a picture 115, by estimating the amount of data for encoding the picture 115 with a given quantization parameter.

Based on the estimate of the amount of data for encoding the picture 115, the master 105 can provide a target rate to the encoders 110 for compressing the picture 115. The encoders 110(0) ... 110(n) can adjust certain parameters that control lossy compression to achieve an encoding rate that is close, if not equal, to the target rate.

The estimate of the amount of data for encoding a picture 115 can be based on a variety of factors. These qualities can include, for example, content sensitivity, measures of complexity of the pictures and/or the blocks therein, and/or the similarity of blocks in the pictures to candidate blocks in reference pictures. Content sensitivity measures the likelihood that information loss is perceivable, based on the content of the video data. For example, in video data, human faces are likely to be more closely examined than animal faces.

In certain embodiments of the present invention, the master 105 can also collect statistics of past target rates and actual rates under certain circumstances. This information can be used as feedback to bias future target rates. For example, where the actual target rates have been consistently exceeded by the actual rates in the past under a certain circumstance, the target rate can be reduced in the future under the same circumstances.

Figure 2:
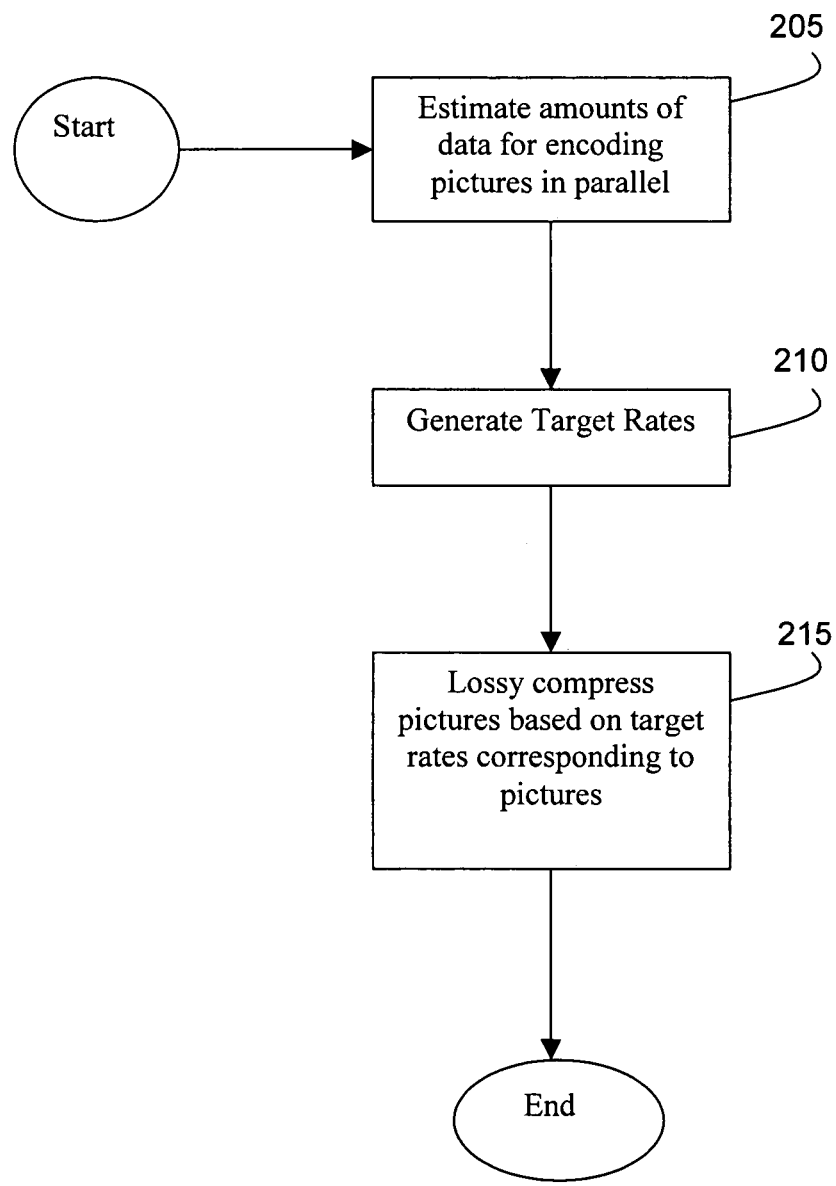
FIG. 2 is a flow diagram for encoding video data in accordance with an embodiment of the present invention.

Referring now to FIG. 2, there is illustrated a flow diagram for encoding video data in accordance with an embodiment of the present invention. At 205, the encoders 110(0) ... 110(n) each estimates the amounts of data for encoding pictures 115(0) ... 115(n) in parallel.

At 210, the master 105 generates target rates for each of the pictures 115(0) ... 115(n) based on the estimated amounts during 205. At 215, the encoders 110(0) ... 110(n) lossy compress the pictures 115(0) ... 115(n) based on the target rates corresponding to the plurality of pictures.

Embodiments of the present invention will now be presented in the context of an exemplary video encoding standard, Advanced Video Coding (AVC) (also known as MPEG-4, Part 10, and H.264). A brief description of AVC will be presented, followed by embodiments of the present invention in the context of AVC. It is noted, however, that the present invention is by no means limited to AVC and can be applied in the context of a variety of the encoding standards.

Advanced Video Coding

Advanced Video Coding generally provides for the compression of video data by dividing video pictures into fixed size blocks, known as macroblocks 320. The macroblocks 320 can then be further divided into smaller partitions 430 with varying dimensions. The partitions 430 can then be encoded as an offset from reference pixels. Ideally, the partitions 430 are similar to the reference pixels, and therefore, the offsets contain smaller amounts of data. The reference pixels can either comprise pixels from the same picture or a different picture. Where the reference block is from the same picture, the partition 430 is spatially predicted. Where the reference block is from another picture, the partition 430 is temporally predicted.

Spatial Prediction

Figure 3A:
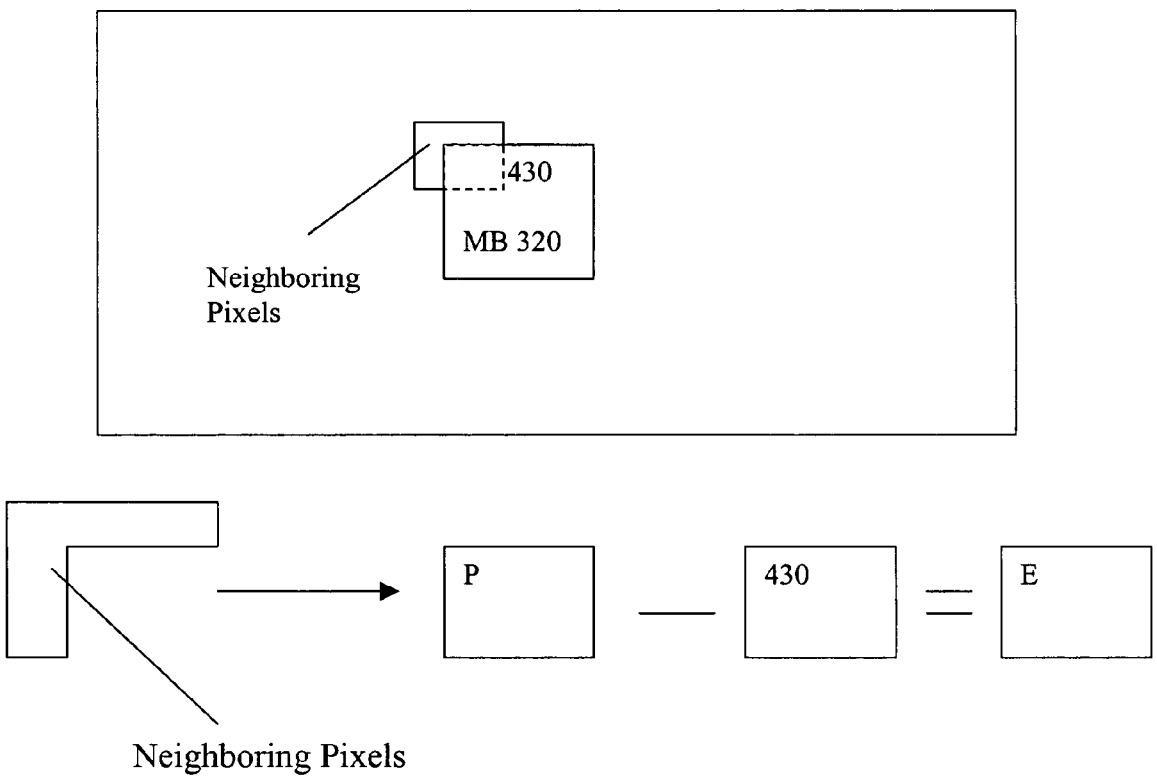
FIG. 3A is a block diagram describing spatially predicted macroblocks.

Referring now to FIG. 3A, there is illustrated a block diagram describing spatially encoded macroblocks 320. Spatial prediction, also referred to as intraprediction, is used by H.264 and involves prediction of pixels from neighboring pixels.

The difference between the partition 430 and neighboring pixels P (reference pixels) is known as the prediction error E. The prediction error E is calculated and encoded.

Temporal Prediction

Figure 3B:
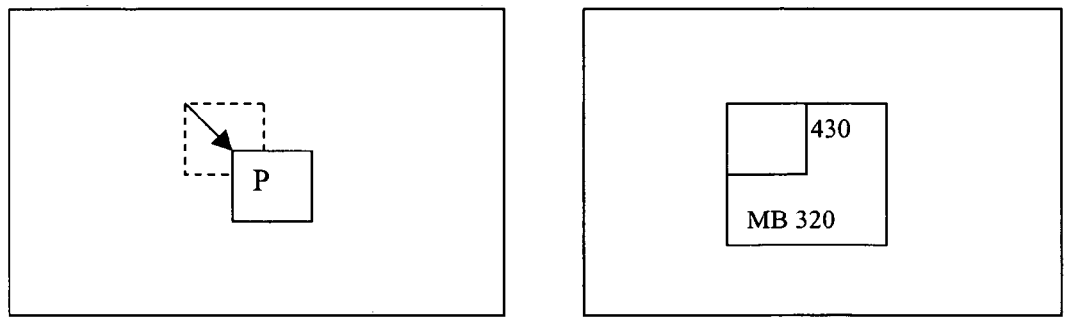
FIG. 3B is a block diagram describing temporally predicted macroblocks.
Figure 3B:
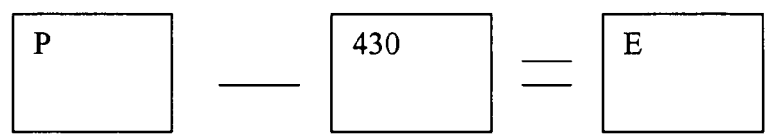

Referring now to FIG. 3B, there is illustrated a block diagram describing temporally prediction. With temporal prediction, partitions 430 are compared to the pixels of other reconstructed frames or fields for a similar block of predicted pixels P. Additionally, the predicted pixels P can be interpolated from pixels in the frame or field, with as much as ¼ pixel resolution in each direction. A macroblock 320 is encoded as the combination of data that specifies the derivation of the reference pixels P and the prediction errors E representing its partitions 430. The process of searching for the similar block of predicted pixels P in pictures is known as motion estimation.

The similar block of pixels is known as the predicted block P. The difference between the block 430 and the predicted block P is known as the prediction error E. The prediction error E is calculated and encoded, along with an identification of the predicted block P. The predicted blocks P are identified by motion vectors MV and the reference frame they came from. Motion vectors MV describe the spatial displacement between the block 430 and the predicted block P.

Transformation, Quantization and Scanning

Figure 4:
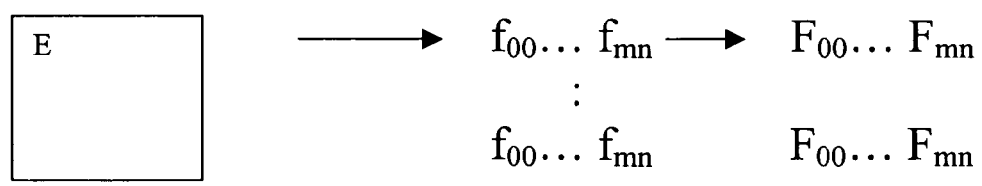
FIG. 4 is a block diagram describing the encoding of a prediction error.

Referring now to FIG. 4, there is illustrated a block diagram describing the encoding of the prediction error E. With both spatial prediction and temporal prediction, the macroblock 320 is represented by a prediction error E. The prediction error E is also two-dimensional grid of pixel values for the luma Y, chroma red Cr, and chroma blue Cb components with the same dimensions as the macroblock 320.

A transformation transforms blocks 430 of the prediction error E to the frequency domain. In H.264, the blocks can be 4×4, or 8×8. The foregoing results in sets of frequency coefficients $f_{00} \ldots f_{mn}$, with the same dimensions as the block size. The sets of frequency coefficients are then quantized, resulting in sets 440 of quantized frequency coefficients, $F_{00} \ldots F_{mn}$.

Quantization is a lossy compression technique where the amount of information that is lost depends on the quantization parameters. The information loss is a tradeoff for greater compression. In general, the greater the information loss, the greater the compression, but, also, the greater the likelihood of perceptual differences between the encoded video data, and the original video data.

The pictures 115 are encoded as the portions 120 forming them. The video sequence is encoded as the frame forming it. The encoded video sequence is known as a video elementary stream. The video elementary stream is a bitstream that can be transmitted over a communication network to a decoder. Transmission of the video elementary stream instead of the video sequence consumes substantially less bandwidth.

Due to the lossy compression, the quantization of the frequency components, there is a loss of information between the encoded and decoded (reconstructed) pictures 115 and the original pictures 115 of the video data. Ideally, the loss of information does not result in perceptual differences. As noted above, both spatially and temporally encoded pictures are predicted from predicted blocks P of pixels. When the spatially and temporally encoded pictures are decoded and reconstructed, the decoder uses predicted blocks P of pixels from reconstructed pictures. Predicting from predicted blocks of pixels P in original pictures can result in accumulation of information loss between both the reference picture 115 and the picture 115 to be predicted. Accordingly, during spatial and temporal encoding, the encoder uses predicted blocks P of pixels from reconstructed pictures 115.

Motion estimating entirely from reconstructed pictures 115 creates data dependencies between the compression of the predicted picture 115 and the predicted picture 115. This is particularly disadvantageous because exhaustive motion estimation is very computationally intense.

According to certain aspects of the present invention, the process of estimating the amount of data for encoding the pictures 115 can be used to assist and reduce the amount of time for compression of the pictures. This is especially beneficial because the estimations are performed in parallel.

Figure 5:
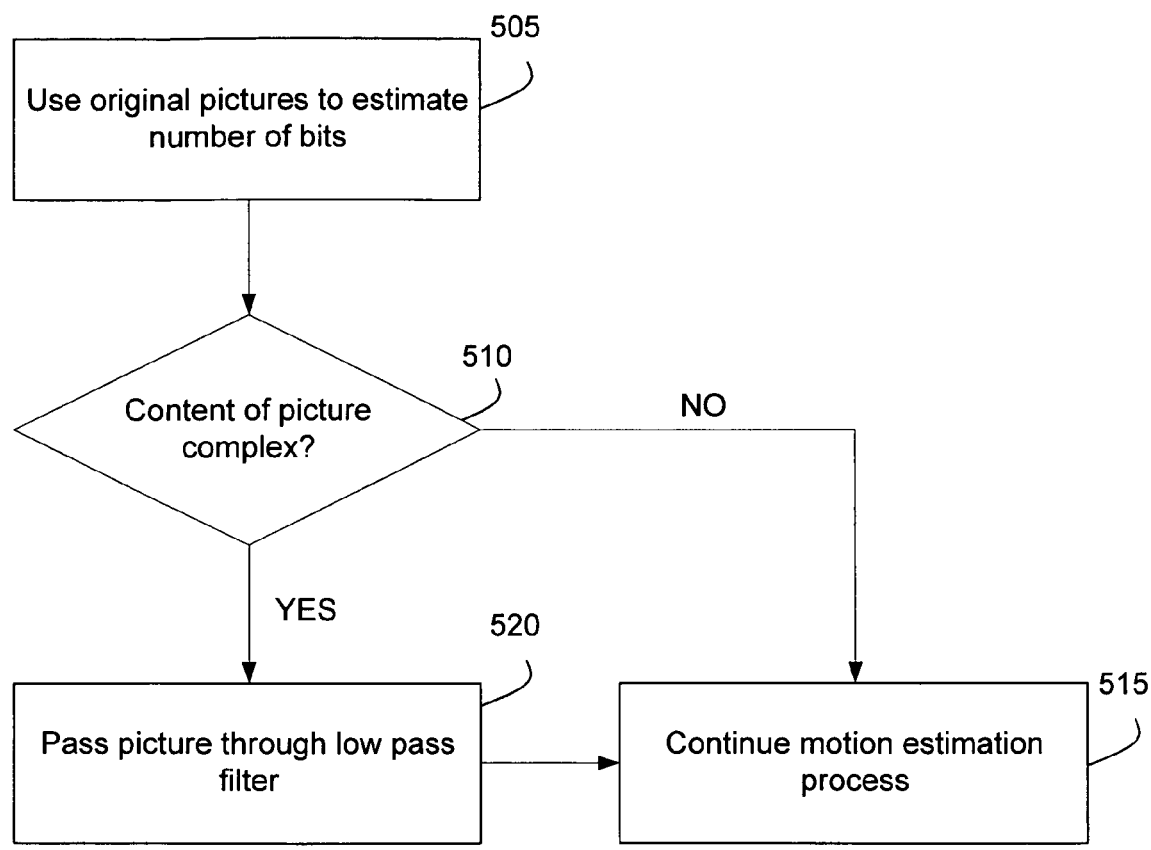
FIG. 5 is a flow diagram for encoding input pictures in accordance with an embodiment of the present invention.

Referring now to FIG. 5, there is illustrated a flow diagram for encoding input pictures, in accordance with an embodiment of the present invention. At 505 the amount of data for encoding input pictures is estimated in parallel, where the original input pictures are used in making the estimation. U.S. Patent Application Ser. No. 60/681,642 filed May 16, 2005 entitled "Systems, Methods, and Apparatus for Real-Time High Definition Encoding" discloses an exemplary method for estimating the amount of data for encoding input pictures. Accordingly, U.S. Patent Application Ser. No. 60/681,642 filed May 16, 2005 is hereby incorporated herein by reference in its entirety.

The motion estimation performed at 505 may be performed on the original pictures or scaled down versions of the original pictures.

At 510, the content of the macroblocks of each of the pictures may be examined to determine whether the content is complex. Complex content may be, for example, high frequency content, sharp edges, salt and pepper noise, etc. If there is no complex content, at 515 the motion estimation process continues as described by U.S. patent application Ser. No. 60/681,642 filed May 16, 2005.

If, on the other hand, complex content is present in the macroblocks, at 520, the picture is passed through a low pass filter to remove and smooth out the complex content. The filtered pictures can then, at 515, be processed using the motion estimation process as described by U.S. patent application Ser. No. 60/681/642 filed May 16, 2005.

Figure 6:
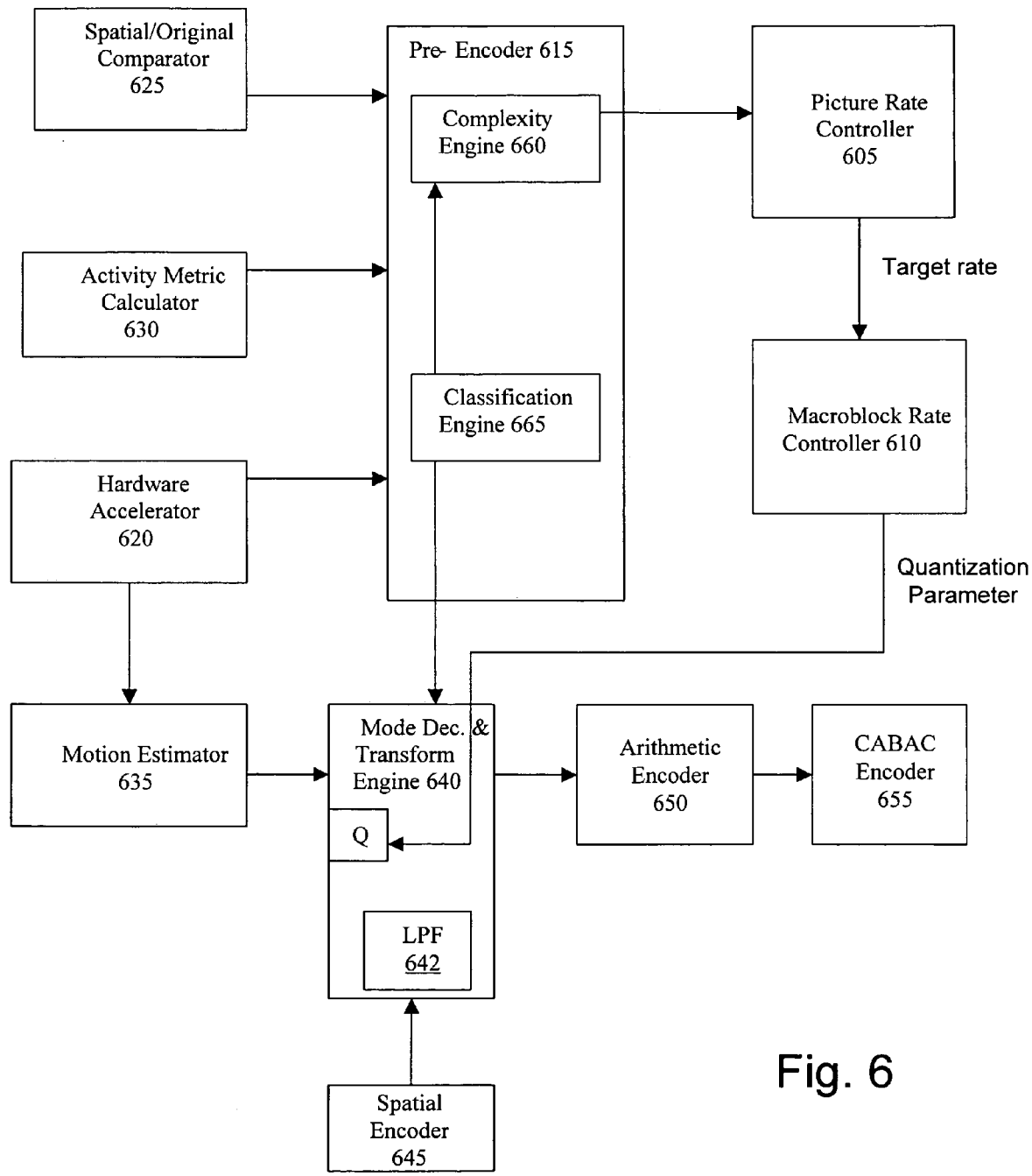
FIG. 6 is a block diagram of a system for encoding video data in accordance with an embodiment of the present invention.
Figure 7:
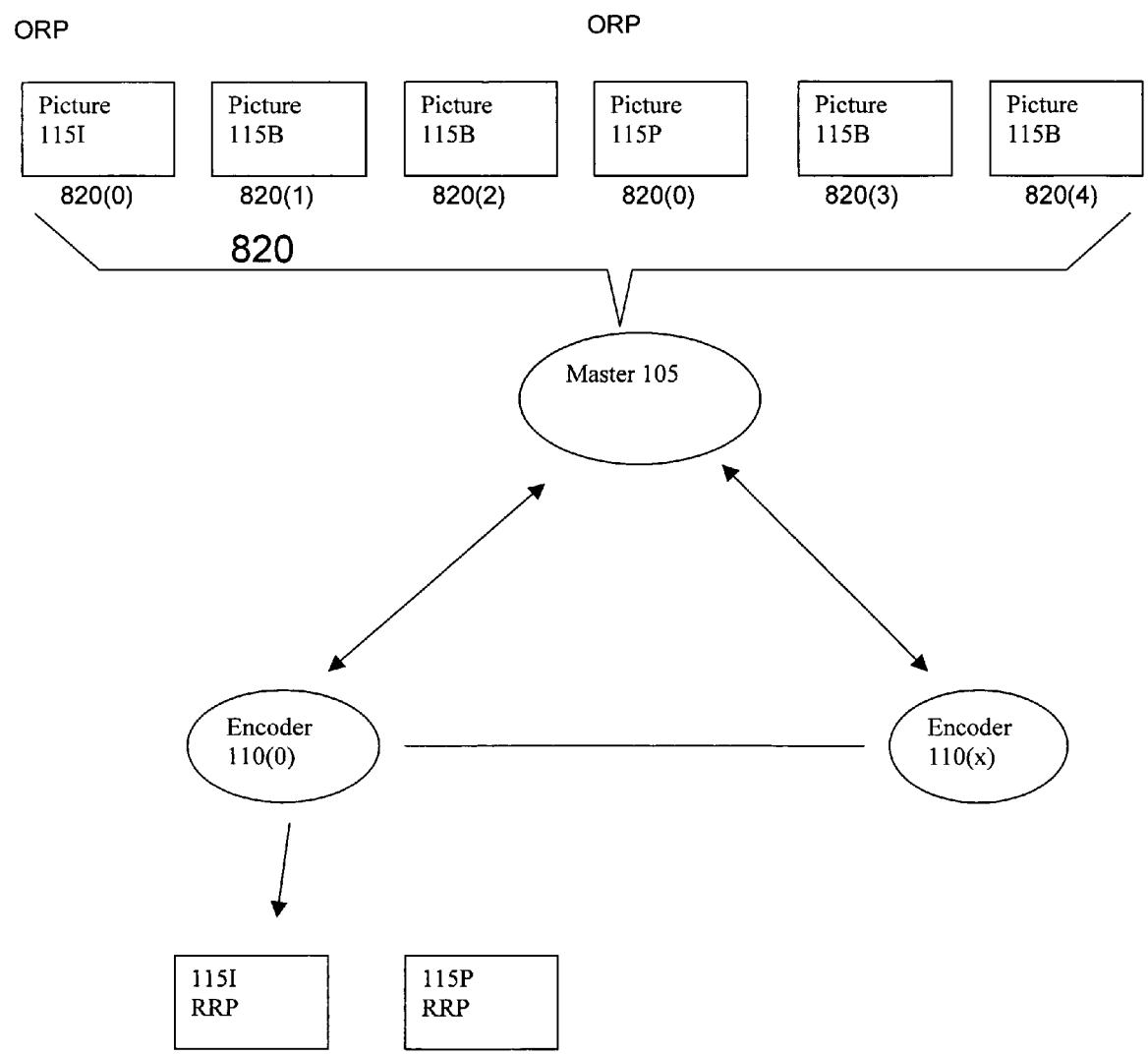
FIG. 7 is a block diagram describing an exemplary distribution of pictures in accordance with an embodiment of the present invention.

Referring now to FIG. 6, there is illustrated a block diagram of an exemplary system 600 for encoding video data in accordance with an embodiment of the present invention. The system 600 comprises a picture rate controller 605, a macroblock rate controller 610, a pre-encoder 615, hardware accelerator 620, spatial from original comparator 625, an activity metric calculator 630, a motion estimator 635, a mode decision and transform engine 640, an arithmetic encoder 650, and a CABAC encoder 655.

The picture rate controller 605 can comprise software or firmware residing on the master 105. The macroblock rate controller 610, pre-encoder 615, spatial from original comparator 625, mode decision and transform engine 640, spatial predictor 645, arithmetic encoder 650, and CABAC encoder 655 can comprise software or firmware residing on each of the encoders 110(0) . . . 10(n). The pre-encoder 615 includes a complexity engine 660 and a classification engine 665. The hardware accelerator 620 can either be a central resource accessible by each of the encoders 110, or decentralized hardware at the encoders 110.

The hardware accelerator 620 can search the original reference pictures for candidate blocks CB that are similar to blocks 430 in the pictures 115 and compare the candidate blocks CB to the blocks 430 in the pictures. The pre-encoder 615 estimates the amount of data for encoding pictures 115.

The pre-encoder 615 comprises a complexity engine 660 that estimates the amount of data for encoding the pictures 115, based on the results of the hardware accelerator 620. The pre-encoder 615 also comprises a classification engine 665. The classification engine 665 classifies certain content from the pictures 115 that is perceptually sensitive, such as human faces, where additional data for encoding is desirable.

Where the classification engine 665 classifies certain content from pictures 115 to be perceptually sensitive, the classification engine 665 indicates the foregoing to the complexity engine 660. The complexity engine 660 can adjust the estimate of data for encoding the pictures 115. The complexity engine 665 provides the estimate of the amount of data for encoding the pictures by providing an amount of data for encoding the picture with a nominal quantization parameter Qp. It is noted that the nominal quantization parameter Qp is not necessarily the quantization parameter used for encoding pictures 115.

The classification engine 665 can also classify the content from pictures 115 according to the level of complexity present in the pictures 115. Complex content may be, for example, high frequency content, sharp edges, salt and pepper noise, etc. With less complex content, the system can perform certain functions more efficiently. If a picture 115 is classified as containing complex content that is not perceptually important by the classification engine 665, the mode decision and transform engine 640, may apply a low pass filter 642 to the picture 115 to remove the complexities. For example, a low pass filter 642 can remove high frequency content, edges, salt and pepper noise, etc., hence smoothing out the pictures 115. The smooth, low pass filtered pictures then can be encoded utilizing a mode determined by the mode decision and transform engine 640. The decision made by the mode decision and transform engine 640 can be base on information received from the hardware accelerator 620 and the spatial from original comparator 625. U.S. patent application Ser. No. 60/681/642 filed May 17, 2005 entitled "System and method for open loop spatial prediction in a video encoder" discloses a system and method of spatial prediction as may be performed by the spatial from original comparator 625. Accordingly, U.S. patent application Ser. No. 60/681,642 filed May 17, 2005 is hereby incorporated herein by reference in its entirety.

The picture rate controller 605 provides a target rate to the macroblock rate controller 610. The motion estimator 635 searches the vicinities of areas in the reconstructed reference picture that correspond to the candidate blocks CB, for reference blocks P that are similar to the blocks 430 in the plurality of pictures.

The search for the reference blocks P by the motion estimator 635 can differ from the search by the hardware accelerator 620 in a number of ways. For example, reconstructed reference picture and the picture 115 can be full scale, whereas the hardware accelerator 620 searches the original reference picture and the picture 115 that can be reduced scale. Additionally, the blocks 430 can be smaller partitions of the blocks by the hardware accelerator 620. For example, the hardware accelerator 620 can use a 16×16 block, while the motion estimator 635 divides the 16×16 block into smaller blocks, such as 8×8 or 4×4 blocks. Also, the motion estimator 635 can search the reconstructed reference picture with ¼ pixel resolution.

The spatial predictor 645 performs the spatial predictions for blocks 430. The mode decision & transform engine 640 determines whether to use spatial encoding or temporal encoding, and calculates, transforms, and quantizes the prediction error E from the reference block. The complexity engine 660 indicates the complexity of each macroblock 320 at the macroblock level based on the results from the hardware accelerator 620, while the classification engine 665 indicates whether a particular macroblock contains sensitive content. Based on the foregoing, the complexity engine 660 provides an estimate of the amount of bits that would be required to encode the macroblock 320. The macroblock rate controller 610 determines a quantization parameter and provides the quantization parameter to the mode decision & transform engine 640. The mode decision & transform engine 640 comprises a quantizer Q. The quantizer Q uses the foregoing quantization parameter to quantize the transformed prediction error. When the rate controller estimates from the complexity estimates that the quantization parameter needed to encode a portion of a picture is too high, quality can be improved by directing the mode and transform engine 640 to filter the portion.

The mode decision & transform engine 640 provides the transformed and quantized prediction error E to the arithmetic encoder 650. Additionally, the arithmetic encoder 650 can provide the actual amount of bits for encoding the transformed and quantized prediction error E to the picture rate controller 605. The arithmetic encoder 650 codes the quantized prediction error E into bins. The CABAC encoder 655 converts the bins to CABAC codes. The actual amount of data for coding the macroblock 320 can also be provided to the picture rate controller 605.

In certain embodiments of the present invention, the picture rate controller 605 can record statistics from previous pictures, such as the target rate given and the actual amount of data encoding the pictures. The picture rate controller 605 can use the foregoing as feedback. For example, if the target rate is consistently exceeded by a particular encoder, the picture rate controller 605 can give a lower target rate.

Referring now to FIG. 8, there is illustrated a block diagram of an exemplary distribution of pictures by the master 105 to the encoders 110(0) . . . 110(x). The master 105 can divide the pictures 115 into groups 820, and the groups into sub-groups 820(0) . . . 820(n). Certain pictures, intra-coded pictures 115I, are not temporally coded, certain pictures, predicted-pictures 115P, are temporally encoded from one reconstructed reference pictures 115RRP, and certain pictures, bi-directional pictures 115B, are encoded from two or more reconstructed reference pictures 115RRP. In general, intra-coded pictures 115I take the least processing power to encode, while bi-directional pictures 115B take the most processing power to encode.

In an exemplary case, the master 105 can designate that the first picture 115 of a group 820 is an intra-coded picture 115I, every third picture, thereafter, is a predicted picture 115P, and that the remaining pictures are bi-directional pictures 115B. Empirical observations have shown that bi-directional pictures 115B take about twice as much processing power as predicted pictures 115P. Accordingly, the master 105 can provide the intra-coded picture 115I, and the predicted pictures 115P to one of the encoders 110, as one sub-group 820(0), and divide the bi-directional pictures 115B among other encoders 110 as four sub-groups 820(1) . . . 820(4).

The encoders 110 can search original reference pictures 115ORP for candidate blocks that are similar to blocks in the plurality of pictures, and select the candidate blocks based on comparison between the candidate blocks and the blocks in the pictures. The encoders 110 can then search the vicinity of an area in the reconstructed reference picture 115RRP that corresponds to the area of the candidate blocks in the original reference picture 115ORP for a reference block.

The embodiments described herein may be implemented as a board level product, as a single chip, application specific integrated circuit (ASIC), or with varying levels of the decoder system integrated with other portions of the system as separate components.

The degree of integration of the decoder system may primarily be determined by the speed and cost considerations. Because of the sophisticated nature of modem processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. For example, the macroblock rate controller 610, pre-encoder 615, spatial from original comparator 625, activity metric calculator 630, motion estimator 635, mode decision and transform engine 640, arithmetic encoder 650, and CABAC encoder 655 can be implemented as firmware or software under the control of a processing unit in the encoder 110. The picture rate controller 605 can be firmware or software under the control of a processing unit at the master 105. Alternatively, the foregoing can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on the AVC encoding standard, the invention can be applied to a video data encoded with a wide variety of standards.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for encoding video data, the method comprising:
   estimating amounts of data for encoding a plurality of pictures in parallel using original reference pictures associated with the plurality of pictures with a plurality of encoders, wherein the estimating includes lossy encoding of the plurality of pictures using reconstructed reference pictures using a master encoder and providing target rates to the plurality of encoders using the master encoder, further wherein the original reference pictures are unaltered by the plurality of encoders;
   classifying the plurality of pictures according to their complexity;
   low pass filtering pictures from the plurality of pictures with high complexity.

2. The method according to claim 1 wherein the complexity indicates an amount of high frequency content associated with the plurality of pictures.

3. The method of claim 1 wherein the original reference pictures are scaled down.

4. A system for encoding video data, the system comprising:
   a hardware accelerator for estimating amounts of data for encoding a plurality of pictures in parallel using original reference pictures associated with the plurality of pictures, wherein the original reference pictures are unaltered by the hardware accelerator;
   a first engine for classifying the plurality of pictures according to their complexity;
   a second engine for low pass filtering pictures from the plurality of pictures with high complexity; and
   a master encoder for lossy encoding the plurality of pictures using reconstructed reference pictures, said master encoder being discrete from the plurality of encoders and providing target rates to the plurality of encoders.

5. The system according to claim 4 wherein the complexity indicates an amount of high frequency content associated with the plurality of pictures.

6. The system of claim 4 wherein the original reference pictures are scaled down.

7. A non-transitory computer readable medium having stored thereon, a computer program having at least one code section encoding video data, the at least one code section being executable by a machine for causing the machine to perform steps comprising:
   estimating amounts of data for encoding a plurality of pictures in parallel using original reference pictures associated with the plurality of pictures, wherein the estimating includes lossy encoding of the plurality of pictures using reconstructed reference pictures using a master encoder and providing target rates to the plurality of encoders using the master encoder, further wherein the original reference pictures are unaltered by the computer program;
   classifying the plurality of pictures according to their complexity;
   low pass filtering pictures from the plurality of pictures with high complexity.

8. The non-transitory computer readable medium according to claim 7 wherein the complexity indicates an amount of high frequency content associated with the plurality of pictures.

9. A non-transitory computer readable medium of claim 7 wherein the original reference pictures are scaled down.

10. A system for encoding video data, the system comprising:
    a hardware accelerator for estimating amounts of data for encoding a plurality of pictures in parallel using original reference pictures associated with the plurality of pictures, wherein the estimating includes lossy encoding of the plurality of pictures using reconstructed reference pictures using a master encoder and providing target rates to the plurality of encoders using the master encoder, further wherein the original reference pictures are unaltered by the hardware accelerator;
    a circuit for classifying the plurality of pictures according to their complexity;
    a low pass filter for low pass filtering pictures from the plurality of pictures with high complexity.

11. The system according to claim 10 wherein the complexity indicates an amount of high frequency content associated with the plurality of pictures.

12. The system of claim 10 wherein the original reference pictures are scaled down.

13. The method of claim 1, wherein estimating amounts of data for encoding a plurality of pictures in parallel using original reference pictures further comprises motion estimating from reference pictures that have not lost information from quantization.

14. The system of claim 4, wherein estimating amounts of data for encoding a plurality of pictures in parallel using original reference pictures further comprises motion estimating from reference pictures that have not lost information from quantization.

15. The non-transitory computer medium of claim 7, wherein estimating amounts of data for encoding a plurality of pictures in parallel using original reference pictures further comprises motion estimating from reference pictures that have not lost information from quantization.

16. The system of claim 10, wherein estimating amounts of data for encoding a plurality of pictures in parallel using original reference pictures further comprises motion estimating from reference pictures that have not lost information from quantization.

17. The method of claim 1, wherein the plurality of pictures are from the same stream.

18. The non-transitory computer readable medium of claim 7, wherein the plurality of instructions causes encoding the plurality of pictures in series by a device that is discrete from a device encoding the plurality of pictures in parallel.

19. The system of claim 10, wherein the low pass filter selectively low pass filters pictures from the plurality of pictures with high complexity.

* * * * *